United States Patent [19]

Huang

[11] Patent Number: 5,545,688
[45] Date of Patent: Aug. 13, 1996

[54] PROCESS FOR MANUFACTURING ACRYLAMIDE MICROEMULSIFIED HOMOPOLYMER

[75] Inventor: Sun-Yi Huang, Fairfield, Conn.

[73] Assignee: Cytec Technology Corp., Wilmington, Del.

[21] Appl. No.: 448,947

[22] Filed: May 24, 1995

Related U.S. Application Data

[63] Continuation of Ser. No. 752,810, Aug. 30, 1991, abandoned.

[51] Int. Cl.$^6$ .................................................. C08L 33/26
[52] U.S. Cl. ........................... 524/827; 524/829; 524/831
[58] Field of Search ....................... 524/827, 829, 524/831

[56] References Cited

FOREIGN PATENT DOCUMENTS 2161492  1/1986  United Kingdom .

*Primary Examiner*—Jeffrey T. Smith
*Attorney, Agent, or Firm*—F. M. Van Riet

[57] ABSTRACT

A process is disclosed whereby an acrylamide homopolymer is prepared in microemulsion form whereby the microemulsion is clear and stable and the polymer solids content is at least 15%, by weight, the process being conducted in the absence of extraneously added salts of saturated, aliphatic, monocarboxylic acids.

2 Claims, No Drawings

PROCESS FOR MANUFACTURING ACRYLAMIDE MICROEMULSIFIED HOMOPOLYMER

The present application is a continuation of application Ser. No. 07/752,810 filed Aug. 30, 1991, now abandoned.

BACKGROUND OF THE INVENTION

The formation of polyacrylamide (PAM) in inverse microemulsion form was first reported by Speiser in 1976–1977 (J. Pharm. Sci 65(12), 1763(1976) and U.S. Pat. No. 4,021,364). In these publications, crosslinked, spherical PAM microemulsion particles with diameters less than 800 Å were prepared at low solids and high surfactant concentrations to encapsulate biologically or pharmaceutically active material. Since then, numerous publications have appeared describing the preparation of PAM polymers via inverse microemulsion polymerization, i.e. U.S. Pat. Nos. 4,521,317, 4,681,912, G.B. 2,169,492A and WO 88/10274.

In general, these processes are either performed at low solids (10% or less) and high surfactant concentrations, or they are performed (1) in the presence of ionic monomers or (2) in the presence of added salts to attain higher solids (10–32%). PAM homopolymers have not been prepared at the higher solids, lower surfactants levels without the aid of stabilizing salts or ionic-comonomers.

U.S. Pat. No. 4,521,317 describes a low solids, high surfactant acrylamide homopolymer microemulsion polymerization using cationic or anionic surfactants. While this process is successful in preparing stable inverse PAM microemulsions, it requires large amounts of surfactants and oil and, consequently, is impractical commercially owing to its high inherent cost.

Higher solids, lower surfactant acrylamide/anionic copolymers and acrylamide/cationic copolymer microemulsions are also known. U.S. Pat. No. 4,681,912 describes a process for preparing (meth)acrylamide/(meth)acrylic acid copolymer microemulsion at higher polymer solids with less surfactant by choosing a nonionic surfactant or a nonionic surfactant mixture with the correct HLB in the correct proportions. WO 88/10274, and copending application Ser. No. 07/285,938 filed Dec. 19, 1988, now abandoned describe processes for preparing (meth)acrylamide/cationic copolymer microemulsions at higher polymer solids with less surfactant by choosing a nonionic surfactant or a nonionic surfactant mixture with the correct HLB in the correct proportions.

There are also several references which describe the preparation of higher solids, lower surfactant PAM homopolymers which can be prepared in the presence of added salts. G.B. 2,169,492A, for example, teaches that higher solids, lower surfactant PAM microemulsions can only be prepared if the microemulsion aqueous phase contains "at least one alkali metal salt of an aliphatic monocarboxylic acid, in a weight ratio of said alkali metal salt to said vinyl monomer of from 0.1/1 to 0.3/1". According to this reference, unstable PAM microemulsion latices result in the absence of salt. In addition, journal articles have also appeared which specifically point out that high solids PAM microemulsion homopolymers can not be prepared unless the AMD microemulsion polymerization is conducted in the presence of an added salt or an ionic monomer (see J. Colloid and Inter. Sci., 114 (2), 398 (1986); J. Colloid and Inter. Sci., 125(1), 97(1988); Colloid and Polymer Sci., 265, 1067(1987)).

SUMMARY OF THE INVENTION

Surprisingly, it has now been found that nonionic PAM microemulsions with high polymer solids levels and lower surfactant concentrations as in G.B. 2,169,492A can be prepared in the absence of metal salts of aliphatic monocarboxylic acids. Consequently, the process of this invention is less expensive since the salt can be omitted. In addition, the resulting PAM latex is devoid of the extraneous salt, which may have a deleterious effect on post reactions of the PAM in the latex or on certain applications where the PAM latex can be used.

Furthermore, it has also been surprisingly found that clear, stable PAM microemulsions can be formed even in formulations which do not start from optically clear monomer microemulsions. Consequently, unlike the monophasic systems, the instant process encompasses the use of cloudy emulsions which are not completely microemulsion in character (i.e. there is some fraction of the system which is a course emulsion or some phase other than a microemulsion). Like systems which are completely microemulsion in character, however, these cloudy system produce stable, nonionic polyacrylamide (PAM) microemulsions (polymer particle diameters approximately 1000 Å and less with narrow particle size distributions) with solids levels up to about 25%–30%.

The ability to prepare PAM homopolymer microemulsions without the need to employ salts of carboxylic acids in the aqueous acrylamide monomer phase makes the process of this invention less expensive by the amount contributed by the salt.

More importantly, the extraneous salt may have a deleterious effect on post reactions of the PAM in the latex or on certain applications where the PAM latex can be used. For instance, a post reaction of a PAM microemulsion requiring a pH outside the buffering pH imparted by the alkali metal salt of an aliphatic monocarboxylic acid used to stabilize the PAM microemulsion will be hampered by the presence of this buffering salt. The salt may also deleteriously affect the pH of the application or interact with other species in the application in less than a desirable fashion.

The process of the invention is ideally suited to prepare PAM microemulsion homopolymer intermediates for further reaction to functionalized PAM microemulsion products. For instance, the PAM microemulsion homopolymers of this invention may be reacted with dimethylamine/formaldehyde to prepare Mannich PAM microemulsions, which are useful as cationic flocculants.

DESCRIPTION OF THE INVENTION INCLUDING PREFERRED EMBODIMENTS

This invention comprises a method for the preparation of a stable microemulsion of a homopolymer of an acrylamide monomer at a polymer solids concentration of at least 15% in the absence of extraneously added acid salts which comprises forming an aqueous phase consisting of an acrylamide monomer and an organic phase consisting of a hydrocarbon oil and a nonionic surfactant having an HLB ranging from about 6 to about 10, the ratio of surfactant to acrylamide ranging from about 0.3–1.4 to 1, adding the organic phase to the aqueous phase at a ratio of aqueous phase to organic phase of about 0.5 to 1 to about 3 to 1 to form a microemulsion, polymerizing said monomer while maintaining the exotherm below about 100° C. and recovering the resultant clear, stable microemulsion.

The acrylamide monomer involved may be acrylamide per se and includes other acrylamide such as methacrylamide, ethacrylamide, N-alkylacrylamides, N,N-dialkylacrylamides, N-vinyl pyrrolidone and the like.

The monomer content of the aqueous phase ranges from about 15–90%, preferably about 25–80%. Additionally, the aqueous phase may also contain an initiator. The water-soluble initiator may be selected from peroxides, persulfates, bromates, and azo-type initiators such as 2,2'azobis-(2-amidino-propane)dihydrochloride, etc. Sulfites, bisulfites, sulfur dioxide, and other reducing agents used with oxidizing initiators to form an initiating redox pair may also be used. A chelator such as diethylenetriaminepentacetic acid penta sodium salt in minor concentrations of from about 0.1 to about 0.01 percent, by weight, based on the total weight of the monomer in aqueous phase may also be added. The aqueous phase of monomer make-up solution can be prepared at any pH for microemulsion polymerization, however, the pH is preferably below 7.0. Additionally, the aqueous phase will contain sufficient amounts of acid so as to maintain the pH below about 7.0. Acids which can be used include a mineral acid such as sulfuric acid, hydrochloric acid, phosphoric acid, etc., an organic acid such as acetic acid, adipic acid, glutaric acid, etc. Chain transfer agents such as isopropanol, mercaptoethanol etc. may also be employed.

The organic phase is composed of a hydrocarbon or hydrocarbon mixture such as paraffinic and/or isoparaffinic hydrocarbons and mixtures. Hydrocarbon oils include such petroleum solvents as Isopar® M and Low odor paraffin solvent (LOPS), and Exxsol® oil. Mineral oil, toluene, fuel oil, kerosene, odorless mineral spirits etc. may also be used. The oil phase may optionally contain the initiator(s), if the particular initiator(s) chosen are oil-soluble. Typical would be 2,2'azo-bis(isobutyronitrile), 2,2'-azobis(2,4-dimethylvaleronitrile) and benzoyl peroxide, benzoin-n-butyl ether, and the like. It is well known to those skilled in the art that the initiator(s) can be chosen to be either water or oil-soluble depending on the particular needs of the system.

The weight ratio of aqueous phase to organic phase ranges from about 0.5 to 1 to about 3 to 1, preferably form about 1.0 to 1 to about 2.0 to 1, with the aqueous phase preferably being added to the organic phase.

The organic phase additionally contains the surfactant which must be non-ionic and must have an HLB ranging from about 6 to about 10, preferably from about 7.5 to about 8.5. The concentration of surfactant used is that necessary to form a microemulsion as is known in the art. Generally, a range of from about 5–20%, by weight, based on the total weight of the organic phase, is employed. Suitable non-ionic surfactants include: a mixture of Atlas G-1086® (polyoxyethylene (40) sorbitol hexaoleate) and Arlacel® 83 (sorbitan sesquioleate); a mixture of Atlas G-1086® (polyoxyethylene (40) sorbitol hexaoleate) and Arlacel® 80 (sorbitan monooleate); a mixture of Atlas® G-1086 polyoxyethylene (40) sorbitol hexaoleate) and Pamsurf® (diethanololeamide); a mixture of Alfonic® 1412–60 (ethoxylated linear alcohols (60 E.O.)) and Pamsurf® (diethanololeamide); Tween® 85 (polyoxyethylene (20) sorbitan trioleate); a mixture of Arlacel® 80 (sorbitan monooleate) and Tween® 85 (polyoxyethylene (20) sorbitan trioleate) and Pamsurf (diethanololeamide); a mixture of Brij® 93 (polyoxyethylene oleyl ether) and Alfonic® 1412–60 (ethoxylated linear alcohols (60% E.O.)); Pamsurf® (diethanololeamide).

The temperature of the polymerization should be controlled such that the exotherm of polymerizations maintained below about 100° C. and preferably below 85° C. Photochemical or thermal polymerization initiation may be used i.e. ultraviolet radiation, free-radical generation e.g. using azobisisobutyronitrile, potassium persulfate etc.

The particle size of the resultant polymer is below about 4000 Å, preferably below about 1000 Å. The molecular weight, as determined by Standard Viscosity is generally above about 2.0, measured by adding 50 g of a 0.2% aqueous polymer solution to 50 g of 2N NaCl aqueous solution stirring the resultant mixture for 5 minutes and determining the viscosity at 25±0.1° C. using a Brookfield viscometer (LVT model) with UL adapter at 60 RPM.

The following examples are set forth for purposes of illustration only and are not to be construed as limitations on the present invention except as set forth in the appended claims. All parts and percentages are by weight unless otherwise specified. The ratio of surfactant to acrylamide is designed as E/M.

EXAMPLE 1

To 299.3 parts of an organic phase containing Isopar M (240.0 parts), Atlas G-1086 (43.78 parts) and Arlacel 83 (15.50 parts), final HLB=8.5; E/M=0.70, are slowly added 200.0 parts of an aqueous phase (pH of 3.0) containing acrylamide (84.69 parts), sodium bromate (0.0042 part) and N-(2-hydroxyethyl)ethylenediaminetriacetic acid with nitrogen. $SO_2$ gas is then bubbled into the microemulsion to initiate polymerization and the gas rate is controlled to keep the exotherm of the polymerization below 40° C. After several hours, the polymerization is complete and yields a clear, stable, PAM microemulsion. The SV is 3.7.

EXAMPLE 2

To 299.3 parts of an organic phase containing Isopar M(240.0 parts), Atlas G-1086(43.78 parts) and Arlacel 83 (15.50 parts), final HLB=8.5; E/M=0.70, are slowly added 299.0 parts of an aqueous phase (pH 3.0) containing acrylamide (84.69 parts), sodium bromate (0.0042 parts), diethylenetriaminepentacetic acid penta sodium salt (0.04 part) and isopropanol (1.27 parts). The resulting clear microemulsion is sparged for 30 minutes with nitrogen. $SO_2$ gas is then bubbled into the microemulsion to initiate polymerization and the gas rate is controlled to keep the exotherm of the polymerization below 40° C. After several hours, the polymerization is complete yielding a clear, stable polymer microemulsion. The resulting PAM possess an SV of 2.7.

EXAMPLE 3

To 245.5 parts of an organic phase containing Isopar M(199.7 parts), Atlas G-1086(31.6 parts) and Arlacel 83(13.9 parts), final HLB=8.2; E/M=0.41, are slowly added 242.5 parts of an aqueous phase (pH 3.0) containing acrylamide (109.8 parts), sodium bromate (0.0055 part), diethylenetriaminepentacetic acid penta sodium salt (0.04 part) and isopropanol (1.65 parts). The resulting cloudy emulsion is sparged for 30 minutes with nitrogen. $SO_2$ gas is then bubbled into the emulsion to initiate polymerization and the gas rate is controlled to keep the exotherm of the polymerization below 40° C. After several hours, the polymerization is complete and yields a clear, stable, polymer microemulsion. The resulting PAM possesses an SV of 2.6.

EXAMPLE 4

To 157.7 parts of an organic phase containing Isopar M(127.4 parts), Atlas G-1086 (21.4 parts) and Arlacel 83(7.59 parts), final HLB=8.5; E/M=0.32, are slowly added 207.48 parts of an aqueous phase (pH 3.0) containing acrylamide (89.7 parts), sodium bromate (0.00555 part), diethylenetriaminepentacetic acid penta sodium salt (0.04 part) and isopropanol (1.35 parts). The resulting cloudy emulsion is sparged for 30 minutes with nitrogen. $SO_2$ gas is then bubbled into the microemulsion to initiate polymerization and the gas rate is controlled to keep the exotherm of the polymerization below 45° C. After several hours, the polymerization is complete and yields a clear, stable polymer microemulsion. The resulting PAM possesses an SV of 2.6.

EXAMPLE 5

To 156.7 parts of an organic phase containing Isopar M (120.6 parts), Atlas G-1086 (24.3 parts) and Arlacel 83 (11.8 parts) final HLB=8.07; E/M=0.40, are slowly added 207.5 parts of an aqueous phase (pH 3.0) containing actylamide (91.0 parts), sodium bromate (0.0055 part), diethylenetriamenepentacetic acid penta sodium salt (0.004 part) and isopropanol (1.37 parts). The resulting cloudy emulsion is sparged for 30 minutes with nitrogen. $SO_2$ gas is then bubbled into the microemulsion to initiate polymerization and the gas rate is controlled to keep the exotherm of the polymerization below 45° C. After several hours, the polymerization is complete and yields a clear, stable polymer microemulsion. The resulting PAM possesses an SV of 2.6.

EXAMPLE 6

The microemulsion polymer particle sizes of the polymerized latices of Examples 2–5 are determined by transmission electron microscopy (TEM). Samples for TEM analysis are prepared by diluting the PAM microemulsions with Isopar M and the resulting TEM video-recorded images analyzed suing a Videoplan image analyzer. The Table below contains the number length mean diameter ($X_{NL}$=X dN/dN), the surface volume mean diameter ($X_{SV}$=$X^3$dN/$X^2$ dN) and the polydispersity of the particle size distribution (P=$X_{SV}$/$X_{NL}$).

TABLE

| Example # | $X_{NL(Å)}$ | $X_{SV(Å)}$ | P |
|---|---|---|---|
| 2 | 500 | 630 | 1.26 |
| 3 | 520 | 660 | 1.27 |
| 4 | 660 | 820 | 1.24 |
| 5 | 570 | 730 | 1.28 |

The PAM microemulsion particles of the process of the invention all possess mean particle diameters well within the microemulsion particle size range. Furthermore, the polydispersities of the PAM microemulsions are quite narrow.

EXAMPLE 7

To 490.4 parts of an organic phase containing LPOS (399.4 parts), Atlas G-1086 (63.2 parts) and Arlacel 83 (27.8 parts) final HLB=8.2; E/M=0.41, are slowly added 487.2 parts of an aqueous phase (pH of 3.0) containing acrylamide (219.6 parts), deionized water (266 parts), diethylenetriamine pentacetic acid penta sodium salt (40%) (0.2 part), sodium bromate (1%) (1.10 part), sulfuric acid (98%) (0.3 part), and mercaptoethanol (1%) (0.66 part). $SO_2$ gas is then bubbled into the microemulsion to initiate polymerization and the gas rate is controlled to keep the exotherm of the polymerization below 85° C. After several hours, the polymerization is complete. The resulting clear microemulsion of PAM possesses an SV of 3.4 cps, a bulk viscosity of 30 cps, and a particle size of 600 Å.

EXAMPLE 8

To 490.4 parts of an organic phase containing LPOS (399.4 parts), Atlas G-1086 (63.2 parts) and Arlacel 83 (27.8 parts) final HLB=8.2; E/M=0.42, are slowly added 466.2 parts of an aqueous phase (pH of 3.0) containing acrylamide (218.4 parts), deionized water (245.6 parts), diethylenetriamine pentacetic acid penta sodium salt (40%) (0.2 part), sodium bromate (1%) (1.12 parts), sulfuric acid (98%) (0.3 part), mercaptoethanol (1%) (0.7 part), and glacial acetic acid (13.2 parts). $SO_2$ gas is then bubbled into the microemulsion to initiate polymerization and the gas rate is controlled to keep the exotherm of the polymerization below 85° C. After several hours, the polymerization is complete and yields a clear, stable, PAM microemulsion. The SV is 3.4 cps and the particle size is 550 Å.

EXAMPLES 9–13

Atlas G-1086 (polyoxethylene(40) sorbitol hexaoleate and sorbitan sesquioleate are dissolved in LOPS to produce the oil phase. An aqueous phase is prepared by dissolving an aqueous solution of acrylamide with diethylenetriaminepentacetic acid penta sodium salt, mercaptoethanol, benzoin-n-butylether and glutaric acid in deionized water. The pH of aqueous phase is 3.4. The aqueous monomer solution is then added to the oil phase. The resulting monomer emulsion is sparged with nitrogen and then initiated with UV light at 25° C. The polymerization is continued for approximately 2 hours. The resulting polymer microemulsion is clear.

| | Ex. 9 | Ex. 10 | Ex. 11 | Ex. 12 | Ex. 13 |
|---|---|---|---|---|---|
| Oil Phase | | | | | |
| HLB | 7.3 | 7.5 | 7.7 | 7.9 | 8.1 |
| LOPS | 199.7 | 199.7 | 199.7 | 199.7 | 199.7 |
| ATLAS G-1086 | 25.2 | 26.6 | 28 | 29.4 | 30.8 |
| Arlacel 83 | 20.3 | 18.9 | 17.5 | 16.1 | 14.7 |
| Aqueous Phase | | | | | |
| AMD(51.6%) | 212.4 | 212.4 | 212.4 | 212.4 | 212.4 |
| $Na_5$ DTPA(40%) | 0.1 | 0.1 | 0.1 | 0.1 | 0.1 |
| $H_2SO_4$ (98%) | 0.15 | 0.15 | 0.15 | 0.15 | 0.15 |
| Glutaric Acid (100%) | 18.6 | 18.6 | 18.6 | 18.6 | 18.6 |
| Mercaptoethanol(1%) | 0.3 | 0.3 | 0.3 | 0.3 | 0.3 |
| $DIH_2O$ | 18.9 | 18.9 | 18.9 | 18.9 | 18.9 |
| Benzoin butylether (2%) | 1.1 | 1.1 | 1.1 | 1.1 | 1.1 |
| Monomer Emulsion Characteristics | Cloudy | Cloudy | Cloudy | Haze | Clear |
| Polymer Microlatex | Clear | Clear | Clear | Clear | Clear |
| SV(cps) | 2.65 | 2.7 | 2.7 | 2.7 | 2.7 |

EXAMPLE 14

To 245.2 parts of an organic phase containing LOPS (199.7 parts), Pamsurf (37.3 parts) and Alfonic 1412–60(13.2 parts), final HLB=7.8; E/M=0.46, are slowly added 242.7 parts of an aqueous phase (pH of 3.3 ) containing acrylamide (109.8 parts ), sodium bromate (0.0055 part), $H_2SO_4$ (0.15 part), diethylenetriaminepentacetic acid penta sodium salt (40%) (0.1 part), mercaptoethanol(1%) (0.33 part) with nitrogen. $SO_2$ gas is then bubbled into the microemulsion to initiate polymerization and the rate is controlled to keep the exotherm of the polymerization below 57° C. After several hours, the polymerization is complete and yields a clear, stable, PAM microemulsion. The SV is 2.9 cps.

EXAMPLE 15

To 244.7 parts of an organic phase containing low order paraffin solvent (199.7 parts), Tween 85 (HLB =11.0) (26.2 parts) and Pamsurf (HLB=6.5) (19.3 parts) (resultant HLB of 9.3), E/M=0.41, are slowly added 243.6 parts of an aqueous phase (pH of 3.4) containing acrylamide (109.8 parts), deionized water (132.5 parts), sulfuric acid (98%) (0.15 part), diethylenetriaminepentacetic acid penta sodium salt (40%) (0.1 part), and t-butyl hydroperoxide (1%) (1.1 part) with nitrogen. $SO_2$ gas is then bubbled into the microemulsion to initiate polymerization and the rate is controlled to keep the exotherm of the polymerization below 53° C. After several hours, the polymerization is complete and yields a clear, stable, PAM microemulsion with an SV of 3.6 cps.

We claim:

1. A method for the preparation of a stable microemulsion of a homopolymer of an acrylamide monomer at polymer solids concentrations of at least 15% in the absence of microemulsion stabilizing amounts of monocarboxylic acid salts which comprises forming an aqueous phase consisting essentially of an acrylamide monomer and an organic phase consisting essentially of a hydrocarbon oil and a nonionic surfactant having an HLB ranging from about 7.3 to about 9.3, the ratio of surfactant to acrylamide ranging from about 0.3–0.70 to 1, adding the organic phase to the aqueous phase at a ratio of aqueous phase to organic phase of about 0.5 to 1 to about 3 to 1 to form a microemulsion, polymerizing said monomer while maintaining the exotherm below about 100° C. and recovering the resultant clear, stable microemulsion.

2. A process according to claim 1 wherein the pH of the aqueous phase is adjusted to below 7.0 prior to polymerization, with a mineral acid, an aliphatic monocarboxylic acid or a dicarboxylic acid.

\* \* \* \* \*